Feb. 1, 1949. E. STILES 2,460,549
DEVICE FOR RECORDING GROCERY WANT-LISTS
Filed Aug. 20, 1946 3 Sheets-Sheet 2
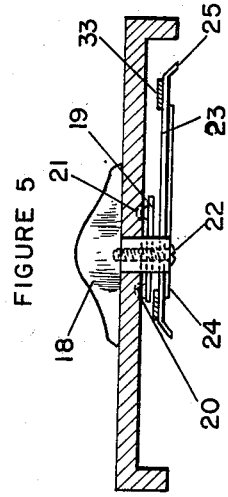
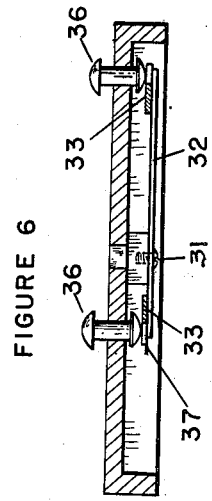
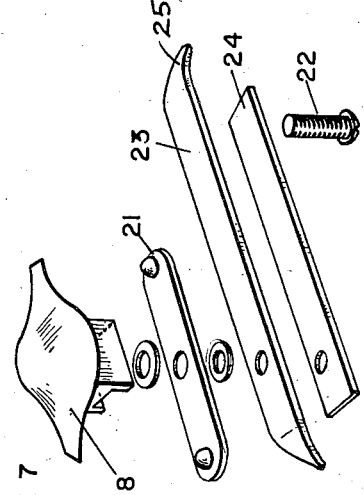
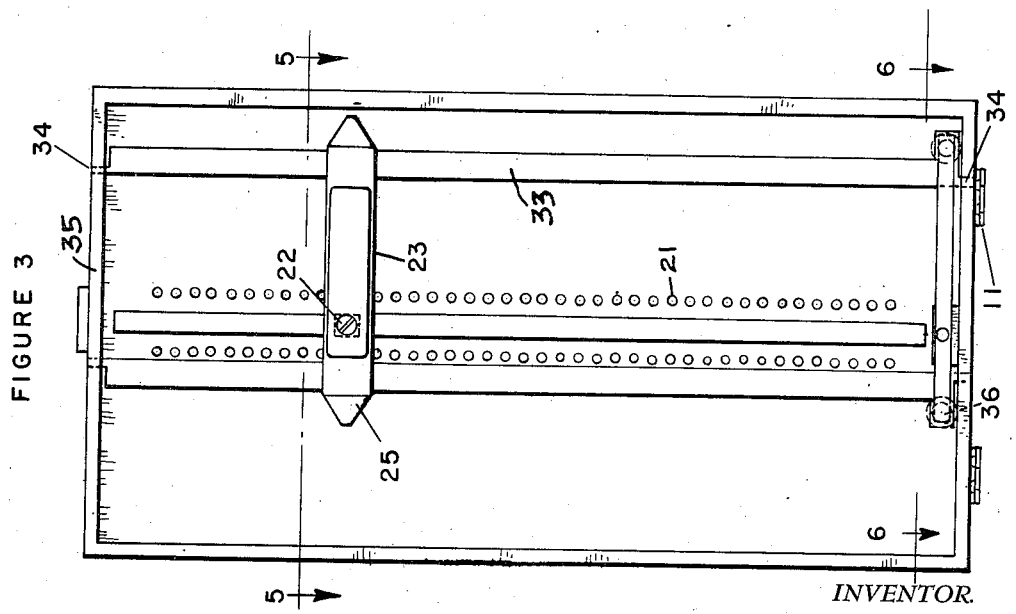
INVENTOR.
EARL STILES
ATTORNEYS Feb. 1, 1949.   E. STILES   2,460,549
DEVICE FOR RECORDING GROCERY WANT-LISTS
Filed Aug. 20, 1946   3 Sheets-Sheet 3
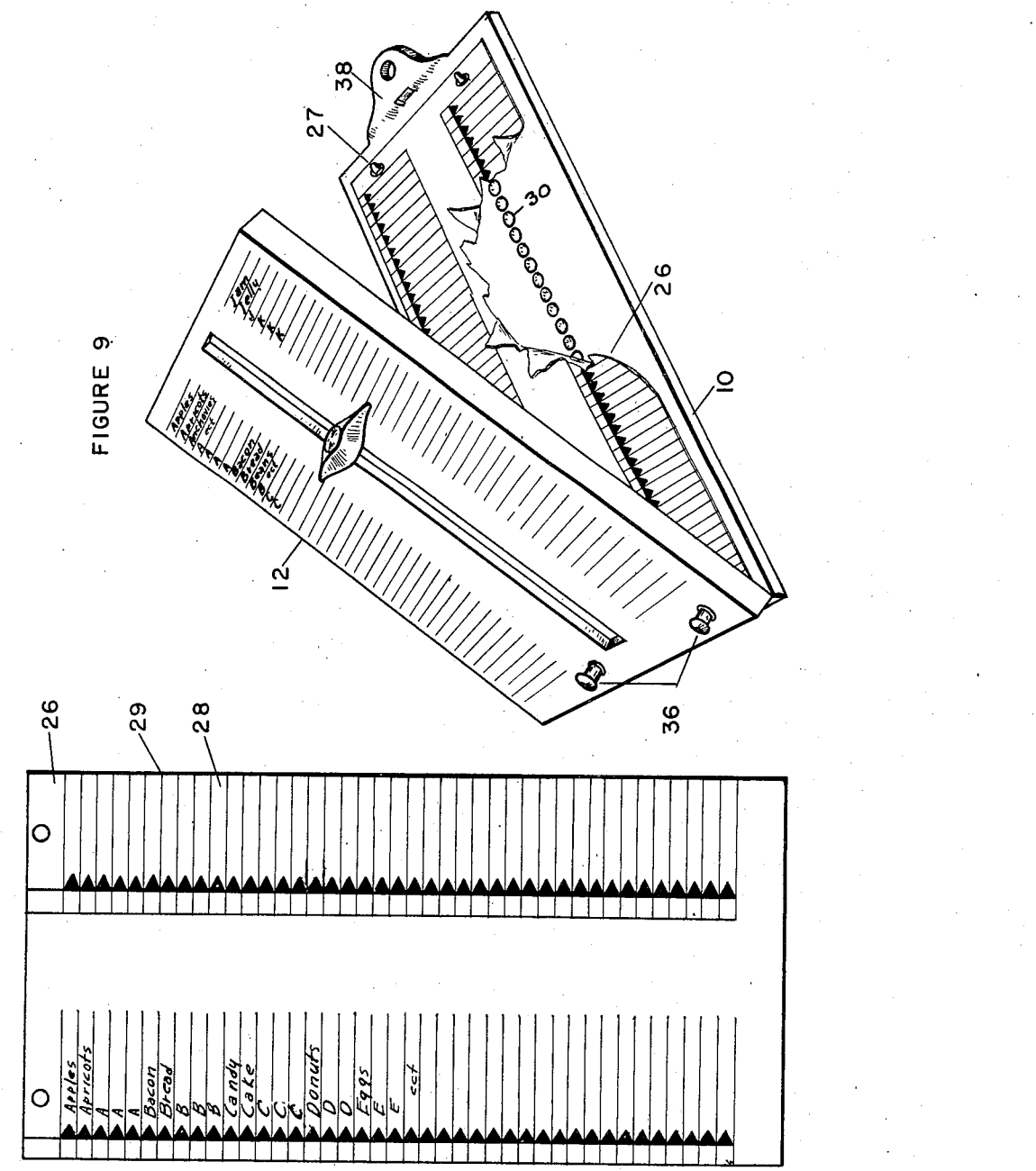
INVENTOR.
EARL STILES
BY Victor J. Evans & Co.
ATTORNEYS Patented Feb. 1, 1949

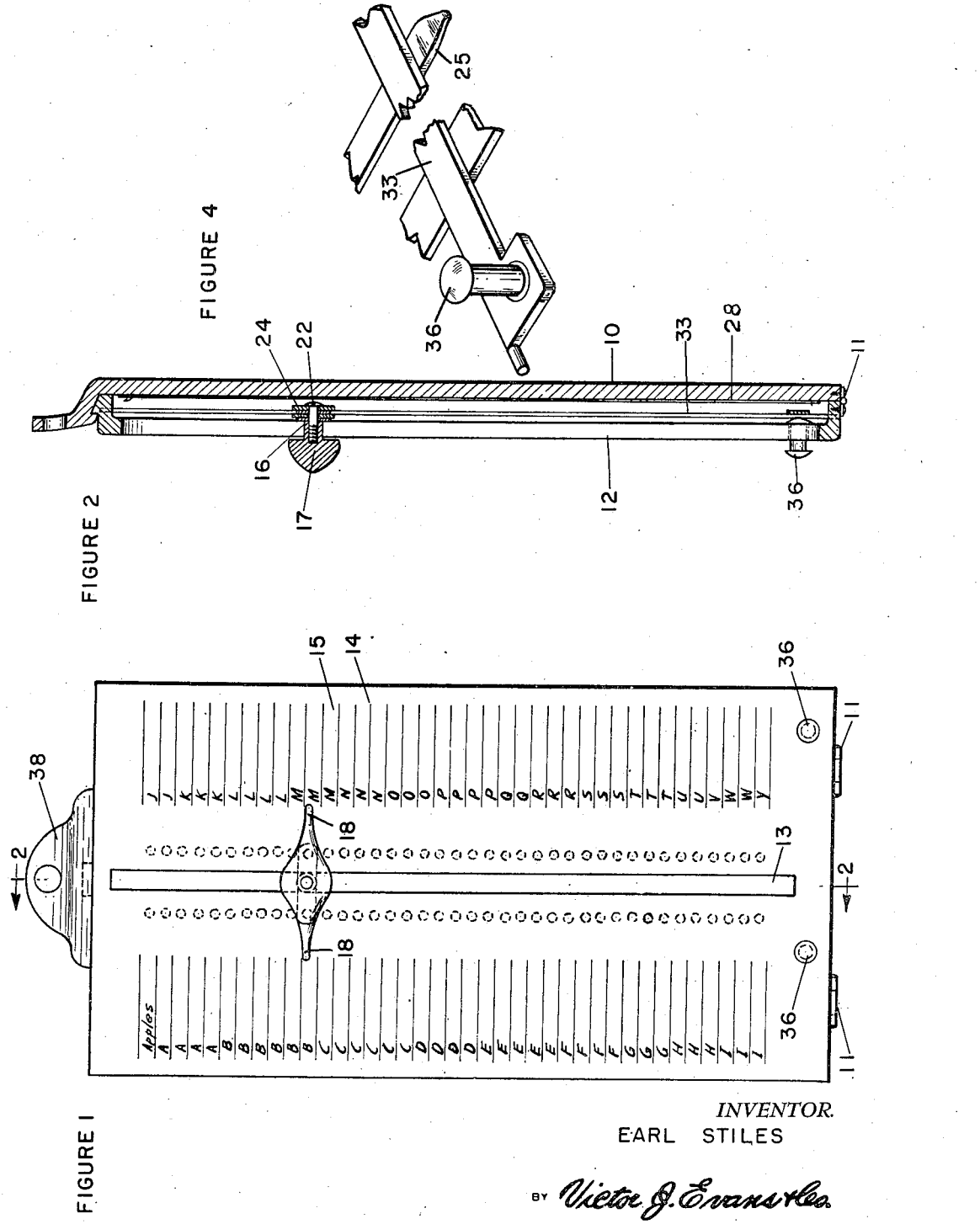

2,460,549

UNITED STATES PATENT OFFICE 2,460,549

DEVICE FOR RECORDING GROCERY
WANT LISTS

Earl Stiles, Lusk, Wyo.

Application August 20, 1946, Serial No. 691,796

2 Claims. (Cl. 164—111)

The invention relates to a reminder aid device for household use, and more especially to a grocery want recording and listing device for household service.

The primary object of the invention is the provision of a device of this character, wherein there can be conveniently recorded, grocery and commodity needs for a household, so that a person is not required to rely on memory for those things wanted or necessary for domestic purposes, the listing of those things being automatically recorded, without requiring manual listing in writing, and thus materially aiding a housewife or domestic in noting with ease and dispatch requirements as they come to the mind.

Another object of the invention is the provision of a device of this character, which is of simple construction, it being susceptible of placement upon a wall, support or the like, for convenience in the use thereof, and ever ready for service.

A further object of the invention is the provision of a device of this character, which is simple in the construction, thoroughly reliable and efficient in operation, strong, durable, readily and easily operated, positive in the working of the same, enabling "want listing" with dispatch and accuracy, and inexpensive to manufacture and install.

With these and other objects in view, the invention consists in the features of construction, combination and arrangement of parts as will be hereinafter fully described, illustrated in the accompanying drawings, which disclose the preferred embodiment of the invention, and pointed out in the claims hereunto appended.

In the accompanying drawings:

Figure 1 is an elevation of the device constructed in accordance with the invention;

Figure 2 is a sectional view taken on the line 2—2 of Figure 1 looking in the direction of the arrows;

Figure 3 is an elevation showing the front cover removed and looking toward the inner face thereof;

Figure 4 is a fragmentary exploded perspective view of the recording mechanism of the device;

Figure 5 is a sectional view taken on the line 5—5 of Figure 3 looking in the direction of the arrows;

Figure 6 is a sectional view taken on the line 6—6 of Figure 3 looking in the direction of the arrows;

Figure 7 is an exploded perspective view of the manually operated indicator knob and adjuncts of associated recording mechanism therefor;

Figure 8 is a plan view of the list sheet removed;

Figure 9 is a perspective view of the device with the front cover partly open and the list sheet partly mutilated for detail illustration.

Similar reference characters indicate corresponding parts throughout the several views in the drawings.

Referring to the drawings in detail, the device constituting the present invention comprises a back panel section 10, which in this instance is of substantially rectangular shape, and may be made from any suitable rigid board-like material, while at the lowermost or one end of this section is connected by hinges 11 a front cover section 12, correspondingly shaped thereto. At the longitudinal median of this section 12 is an elongated slot 13, while at opposite sides of the latter are spaced horizontally ruled lines 14, these being in vertically columnar order, to provide tabulated spaces 15 for names of commodities, which names are permanently and alphabetically disposed for convenience in the use of the device.

Slidably accommodated in the slot 13 in the section 12 is a block-like runner 16 which is provided outside of the said section with a finger engaging knob 17, it having oppositely disposed laterally projected pointers or indicators 18, which are adapted for coinciding with any selected name of the listing of commodities appearing in the spaces 15 before named. Counterseated in the runner 16 is a spring leaf latch 19, having the frictional keeper lugs 20 for releasably engaging in keeper notches 21 provided in the inner face of the section 12, spaced from each other and in vertical row arrangement to opposite sides of the slot 13, these being parallel with one another. Thus the pointers 18 each can be frictionally latched in a shifted position selectively to the spaces 15 for identifying a determined commodity by name therein.

Underlying the latch 19 and fixed to the runner 16 by a fastener 22 is a resilient or spring cross bar 23 reinforced by a backing strip 24, and this bar 23 at its outer ends is formed with puncturing recorder tips 25 for perforating a listing sheet 26 which is releasably attached at 27 on the section 10, as best seen in Figure 9 of the drawings. The top face of the sheet 26 is marked identically to the marking on the front cover section 12, with the lines 28 and spaces 29, respectively, registering with the lines 14 and spaces 15 on this section 12, so that the tips will cut through the sheet 26, at selected spaces 29, the section 10 being formed with depressions 30 underlying the sheet 26, whereby the puncturing thereof will be assured in the operation of the device.

Next to the hinged end of the cover section 12 and mounted at the inner side as at 31 thereof, is a resetting leaf spring 32, which acts against rocking treadles 33, these being trunnioned at 34 in the end flanges 35 of the section 12, and bridge the bar 23 next to the tips 25, so as to have these puncture the sheet 26 when the treadles 33 are rocked in one direction through pressure against said bar. The treadles 33 are disposed at opposite sides of the slot 13, and parallel therewith in the longitudinal direction of the columnar arrangement of spaces 15 and 29, respectively, to be disposed to close the tips 25 for puncturing operation thereof.

Fitted in the cover section 12 are depressible actuator buttons 36, one allocated to each columnar space thereon, and these buttons play against lateral lever extensions 37 on the treadles 33 which overlie the leaf spring 32, each button 36 being manually depressed for the puncturing of the sheet by a selected tip 25 and thus effecting a recording on the sheet 26 of a selected commodity in the "want listing" thereon. When pressure is removed from the selected button 36, the recording mechanism of the device returns to a normal condition, as should be obvious.

When a complete recording has been had on the sheet 26, it is removed, and an unrecorded sheet substituted therefor in the device for further servicing thereby.

The cover section 12 is releasably latched in closed position by a latching device 38, which also creates a hanger for the device for suspension on a vertical wall or support.

What is claimed is:

1. A device of the kind described, comprising a back panel section, a cover section for the back section and having external columnarly arranged indicia thereon, a movable pointer selectively following the indicia, a puncturable sheet superimposed on the back section and having columnarly arranged indicia identical to that of the cover section, puncture mechanism, forming a recorder for the sheet, carried by the cover section and set by the pointer on adjustment thereof, manually operated means on the cover section for actuating the said mechanism when set by the pointer, means for returning the mechanism to normal non-recording position, and a hanger on the back section and latching the cover thereto.

2. A device of the kind described, comprising a back panel section, a cover section for the back section and having external columnarly arranged indicia thereon, a movable pointer selectively following the indicia, a puncturable sheet superimposed on the back section and having columnarly arranged indicia identical to that of the cover section, puncture mechanism, forming a recorder for the sheet, carried by the cover section and set by the pointer on adjustment thereof, manually operated means on the cover section for actuating the said mechanism when set by the pointer, means for returning the mechanism to normal non-recording position, a hanger on the back section and latching the cover thereto, and means on the back section for detachably holding the sheet in place thereon.

EARL STILES.

REFERENCES CITED

The following references are of record in the file of this patent:

UNITED STATES PATENTS

| Number | Name | Date |
| --- | --- | --- |
| 522,977 | Dudley | July 17, 1894 |
| 1,127,814 | Shanklin | Feb. 9, 1915 |
| 2,174,088 | Jensen | Sept. 26, 1939 |
| 2,392,488 | Maccallum | Jan. 8, 1946 |